United States Patent [19]

Palmer

[11] 4,311,661
[45] Jan. 19, 1982

[54] RESIN IMPREGNATION PROCESS

[75] Inventor: Raymond J. Palmer, Newport Beach, Calif.

[73] Assignee: McDonnell Douglas Corporation, Long Beach, Calif.

[21] Appl. No.: 146,769

[22] Filed: May 5, 1980

[51] Int. Cl.³ .............................................. B29D 3/02
[52] U.S. Cl. .................................. 264/510; 264/102; 264/257
[58] Field of Search .............. 264/510, 101, 102, 257, 264/258, 313, 316; 156/286; 427/394

[56] References Cited

U.S. PATENT DOCUMENTS

| | | | |
|---|---|---|---|
| 3,523,152 | 8/1970 | Curtis | 264/257 X |
| 3,575,756 | 4/1971 | Maus | 156/286 X |
| 3,666,600 | 5/1972 | Yoshino | 264/510 X |
| 3,703,422 | 11/1972 | Yoshino | 156/286 X |
| 3,790,432 | 2/1974 | Fletcher et al. | 264/257 X |
| 4,201,823 | 5/1980 | Russell | 264/101 X |

Primary Examiner—Jan H. Silbaugh
Attorney, Agent, or Firm—Max Geldin

[57] ABSTRACT

Process for producing a resin-fiber composite which comprises applying a "B" stage resin film to a mold surface, placing a fiber reinforcement layer over the "B" stage film, applying a porous parting film over the fiber reinforcement layer, applying a bleeder layer over the fiber reinforcement layer and placing a non-porous material over the bleeder layer. A bag is placed over the materials and sealed to or around the mold. A vacuum is applied to the mold and then the assembly is heated to a temperature sufficient to cause the "B" stage resin to flow and to impregnate the reinforcement layer, and pass up through the porous parting film and to impregnate the bleeder layer. The volume of resin provided by the "B" stage resin film is calculated so that saturation of both the fiber reinforcement layer and the bleeder layer occur, assuring uniform impregnation of the fiber reinforcement layer. The mold pressure is then increased and the temperature is raised to produce final curing of the resin impregnated fiber reinforcement layer, and the resulting resin impregnated fiber reinforcement layer is removed from the mold. A curable resin liquid can be employed in place of the "B" stage resin film.

24 Claims, 1 Drawing Figure

U.S. Patent  Jan. 19, 1982  4,311,661
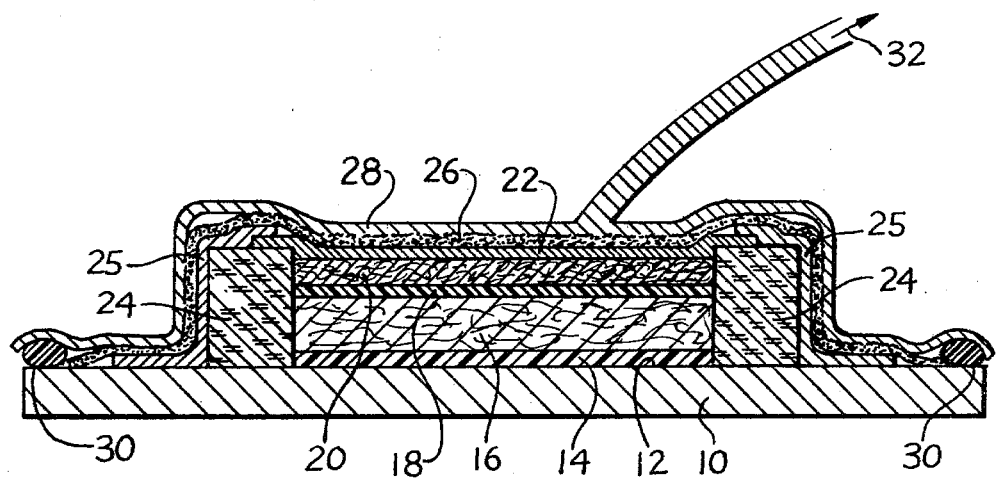

RESIN IMPREGNATION PROCESS

BACKGROUND OF THE INVENTION

This invention relates to a process for producing resin impregnated fiber reinforced materials, and is particularly concerned with novel procedure for impregnating dry fiber reinforcement, e.g. in the form of layers thereof, with a predetermined amount of resin, followed by final curing, to produce a resin impregnated reinforcement material which is essentially completely and uniformly saturated with a predetermined amount of resin.

The concept of impregnating dry fibrous materials such as glass fiber, with a resin under vacuum conditions, and curing the resin to produce a composite is known in the art, as disclosed, for example, in U.S. Pat. Nos. 3,028,284; 3,322,566; 3,384,505; 3,523,152; 3,790,432 and 4,030,953.

Most structural type composite parts are presently made from "B" stage resin impregnated woven cloth or unidirectional tape fibers such as graphite, boron, Kevlar (aramide) or glass fiber materials. The resin is partially cured or "staged" to the desired consistency for tack and handling characteristics that will allow a later heat and pressure cycle to complete the fabrication process.

However, the "B" stage fiber reinforcement materials so produced are perishable when stored and must be stored at low temperatures to preserve a useful shelf life. Further, such stored materials require frequent inspection and recertification to assure good storage quality.

It is an object of the present invention to provide a novel economical process for impregnating fiber reinforcement material with a resin so as to produce uniform impregnation of resin into the fiber reinforcement material. A further object is to provide a process of the above type wherein the fiber reinforcement material is saturated or impregnated with a predetermined desired resin content for optimum mechanical properties. A still further object is to provide a process for impregnating fiber reinforcement material and curing the resin, directly on a tool or mold, and thus by-passing the more expensive prior art operation of first forming a "prepreg" or fiber reinforcement impregnated with "B" stage resin, which is stored prior to final curing.

SUMMARY OF THE INVENTION

The above objects and advantages are achieved according to the invention by the provision of a process for producing a resin-fiber composite which comprises
  (a) forming an assembly comprising a curable resin film, a fiber reinforcement layer, a porous parting film, and a bleeder layer, on the surface of a mold,
  (b) placing the assembly under a vacuum,
  (c) initially heating the assembly to a temperature sufficient to cause said resin to flow and to impregnate said fiber reinforcement layer, pass through said porous parting film and impregnate said bleeder layer, the amount of resin employed being sufficient to provide essentially complete and uniform saturation of resin into said fiber reinforced layer, and
  (d) further heating said assembly at a sufficient temperature and pressure to effect final curing of the resin impregnated fiber reinforcement layer, and to form a resin impregnated fiber reinforcement composite.

More particularly, according to one mode of procedure, a "B" stage resin film, such as a "hot melt" epoxy "B" stage resin, of calculated or predetermined thickness is placed on the surface of a tool or mold. Dry fiber reinforcement, e.g. in the form of woven cloth such as glass fiber or graphite is placed over the "B" stage resin film. Such reinforcement can be in the woven, sewn, stapled or knit condition. Such reinforcement layer can be formed of a single layer or as multiple layers of simple or complex shape.

A permeable or porous parting film such as glass fibers coated with fluorocarbon, e.g., Teflon, is then applied over the dry fiber reinforcement layer, and a calculated or predetermined amount of bleeder material is applied over the permeable parting film to absorb a predetermined amount of resin and control the resin content of the final resin impregnated fiber reinforcement composite. Such bleeder material can be, for example, glass fiber cloth. An edge dam is located around this assembly to control resin flow during the later cure cycle. A non-porous film is then used to seal the overall surface of the assembly. A breather cloth is then applied over the seal film, and a vacuum bag is placed over the entire assembly and sealed to the mold surface.

The resulting assembly is placed in an autoclave to carry out a heat and pressure cure cycle. A vacuum is drawn on the assembly and the assembly is heated to cause the resin film to melt and impregnate up through the fiber reinforcement layer, through the porous parting film and into the bleeder layer or cloth to completely saturate both the fiber reinforcement layer and the bleeder layer. The thickness of the resin film is calculated so that when the resin impregnates the fiber reinforcement layer and the bleeder layer, both enclosed within the seal film layer and the edge dam of the tool, the end result will be the desired resin content in the cured resin-impregnated fiber reinforcement composite or panel.

After a period of time following resin impregnation, autoclave pressure is increased and the temperature raised to a sufficiently high temperature to complete the curing of the resin in the resin impregnated fiber reinforcement composite.

According to an alternative mode of procedure, a wet resin such as a liquid epoxy resin, can be substituted for the "B" stage, or partially cured resin film. For this purpose a measured and calculated amount of liquid resin containing a hardener or catalyst is spread on the tool surface to form a liquid resin film, with the dry reinforcement material placed in the resin. The other elements of the assembly and the curing procedure is otherwise the same as described above.

The cure cycle can be completed as a continuous cycle or the cure cycle can be stopped after sufficient densification, and before the resin gels, the assembly cooled to room temperature and the thickness or resin content of the reinforcement layer then checked; and additional resin added or more bleeder added as required, and the assembly rebagged and the cure cycle completed. This affords an in-process correction step for quality control.

DESCRIPTION OF PREFERRED EMBODIMENTS

The invention will be more clearly understood by reference to the accompanying drawing illustrating a preferred arrangement for carrying out the invention process.

Referring to the drawing, numeral 10 represents the base of a tool or mold for impregnating a fiber reinforcement with a resin according to the invention. A coating of a mold release material such as silicone or Teflon emulsion (Freekote 33) is first applied to the mold surface 12. A partially cured, that is "B" stage, resin film 14 of predetermined thickness, e.g. ranging from about 0.005" to about 0.25 inch thick can be employed, and can be made up of a number of plies to give the desired resin content to the final laminate product. For this purpose, various thermosetting resins, preferably "hot melt" epoxy "B" stage resins with good flow characteristics when heated and prior to cure can be employed in the process. Preferred epoxies comprise the glycidyl ethers such as the glycidyl ethers of the phenols, and particularly those prepared by reacting a dihydric phenol with epichlorhydrin, e.g. the diglycidyl ether of bisphenol A, and including epoxy novolacs. Other thermosetting resins or polymers having similar "B" stage properties when heated can also be employed, such as polyesters, polyimides, both condensation and addition types and phenolic resins.

A dry fiber reinforcement layer 16 is then applied over the "B" stage resin film. Such fibrous reinforcement can be in the form of fibers, woven cloth, mat, stitched material, tow, yarn, tape, and the like. Such fiber reinforcement can be made up of several layers, and have a thickness of about 0.005 to over 1 inch. The fiber reinforcement can be comprised of various materials such as glass fiber, carbon, graphite, boron, aramide, such as the material marketed as Kevlar, and the like.

A permeable parting film 18 is applied over the dry fiber reinforcement 16. Such parting film functions to permit liquid resin to flow or pass through the film, and such parting film can be separated from the adjacent fiber reinforcement layer after the curing cycle is completed. For this purpose, various materials can be employed, such as Teflon, tedlar, the latter two materials being fluorinated hydrocarbons, Silicone rubber films with non-sticking properties can be perforated and made porous to function as permeable parting films. A porous Teflon-coated glass fiber cloth is a specific example of a suitable permeable parting film.

Over the parting film 18 is applied a bleeder material 20. The bleeder material can be any non-reacting absorbent material such as glass fiber cloth, polyester paper and other nonreactive absorbent materials. The bleeder can be in the form of several layers. Such bleeder material can range from about 0.005 to about 0.1 inch thick, and the amount of bleeder utilized is calculated to absorb a desired amount of resin.

Edge dams 24 are placed around this lay-up arrangement to retain and restrict flow of resin during the resin cure cycle.

A non-porous seal film 22 is next applied over the bleeder material 20 and edge dams 24. For this purpose, nylon or other non-porous film is used to trap the resin in the fiber reinforcement 16 and the bleeder material 20. A masking tape 25 is used to attach the seal film 22 of the edge dams 24, such tape 25 being attached to the tool surface 12.

A breather cloth layer 26 is placed over the non-porous seal film 22 and over the edge dams 24 to prevent vacuum block off of the outer vacuum bag. Such breather material can be comprised of glass fiber cloth, polyester paper, and the like.

A vacuum bag 28 is then placed over the entire lay-up, and the edges of the vacuum bag are sealed as at 30 to the surface 10 of the tool. A vacuum hose 32 is connected to the bag 28 to draw a vacuum within the interior of the lay-up. The entire tool and assembly is placed within an autoclave (not shown).

For impregnating the reinforcement layer 16 with resin according to the invention, a vacuum is first drawn through vacuum hose 32, to draw all of the air out of the fiber reinforcement layer 16, and also out of the bleeder material layer 20.

After a vacuum is drawn, heat is applied to the assembly sufficient to raise the temperature so as to cause the resin film at 14, e.g. in the form of a "B" stage resin, to convert from a solid to a low viscosity liquid. As a result of the heat and application of a vacuum, the resin in liquid form will then permeate through the fiber reinforcement 16, through the permeable parting film 18 and into the bleeder material 20. The resin first saturates the fiber reinforcement 16 and the excess resin flows through the permeable parting film 18 into the bleeder 20, saturating the bleeder. Because of the application of a vacuum, substantially complete impregnation of the fiber reinforcement occurs, resulting in low void content of the resulting resin impregnated reinforcement. Due to the presence of the permeable parting film 18 and the bleeder material 20, the resin saturates the fiber reinforcement uniformly at the center and at the corner portions. In the absence of the parting film and bleeder, the corners of the fiber reinforcement are not assured of being completely saturated with the resin. By complete saturation of the reinforcement material is meant that the latter becomes essentially void-free.

The time required for saturation of the fiber reinforcement is relatively short, e.g. of the order of about 2 to about 10 minutes, dependent on temperature, resin viscosity, and thickness of the fiber reinforcement. Thus, for example, for a fiber reinforcement lay-up ⅛" thick and using a hot melt epoxy resin film 14 at 250° F., impregnation of the fiber reinforcement 20 will occur in about 2 to about 5 minutes.

After impregnation, the cure cycle can be completed at the proper curing temperatures for the particular resin. Thus, for example, using a hot melt epoxy, curing temperatures can range from about 250° F. (for 8 hours curing time) to 350° F. (for 2 hours curing time). After the initial period of heating, the vacuum can be either disconnected or retained during the final cure cycle. Usually, pressure from an autoclave or press is required to develop optimum mechanical properties, employing pressures of about 50 to about 100 psi. The preferred amount of resin impregnated into the fiber reinforcement in the cured composite ranges from about 24 to about 34% by volume, and can be controlled to within ±2%. Void content can range from 0 to about 3% by volume.

It has been found that about 2% void content good quality resin impregnated fiber reinforcement panels or composites can be obtained using vacuum pressure of only, e.g. 25-28" mercury. The present process does not require application of a high vacuum. Only the vacuum pressure used during initial heating need be employed during the final curing stage. Preferably, to obtain the highest quality parts, having void content less than 1%, both vacuum for drawing the resin into the fiber reinforcement and the application of positive pressure during curing as by use of an autoclave at 100 psi pressure are required. Vacuum-pressure cure systems can be employed for the particular resin utilized so as to develop the low void content-high strength composites of the invention.

The following is a specific example of operation of the invention process.

A coating of a mold release material is applied to a suitable mold surface.

A 0.065" thickness of "B" stage film, Narmco #b 5208 resin, an epoxy novolac with aromatic amine hardener, and formulated for high flow and low viscosity, is applied on the tool.

On top of the "B" stage film is located 8 layers of biwoven 8 harness satin weave graphite cloth, each ply having a thickness of 0.013", as fiber reinforcement material.

One layer of porous parting film comprised of permeable Armalon, a glass fiber coated with fluorocarbon, is then applied over the fiber reinforcement to function as a separator between the fiber reinforcement layer and the subsequently applied bleeder cloth.

Four layers of bleeder cloth are applied over the parting film to absorb the excess resin from the fiber reinforcement layer. The bleeder material employed is Mochburg CW 1850 polyester paper bleeder.

Corprene dams in the form of a cork-neoprene sheet with contact adhesive on the lower surface are placed around the above described assembly to retain the flow of resin during the cure cycle.

A non-porous nylon film, 0.002" thick, is placed over the bleeder cloth and the edges of the film are sealed to the edge dams and to the tool with masking tape. An upper metal pressure plate can be substituted for the nylon film using the same masking tape edge seal. The objective is to trap the resin in the enclosed space between the tool, the edge dams and the upper non-porous film or metal pressure plate.

A glass fiber breather cloth is then placed over the non-porous film and the edge dams to prevent vacuum block off and pressure bag breakage.

A vacuum bag is then applied over the entire assembly and the edges of the vacuum bag sealed to the tool. A nylon bag, 0.002" thick, or silicone rubber, are suitable vacuum bag materials. The vacuum bag may envelop the complete assembly and the tool.

The entire assembly is placed in an autoclave for the heat and pressure cure cycle. High quality resin impregnated fiber reinforcement composites are produced employing the following procedure.

A vacuum of 25–28" mercury is drawn on the system. The arrangement is then heated to 275° F. at a rate of 3° F. to 7° F. per minute of heat rise. The heat causes the resin to melt to a low viscosity and impregnate up through the graphite cloth fiber reinforcement, through the porous parting film and into the bleeder cloth to completely saturate both the graphite reinforcement cloth and the bleeder cloth. The volume of resin is calculated so that when saturation is complete, the resin content of the fiber reinforcement layer will be at the desired content for optimum mechanical properties of the final cured panel, usually between about 30 and 35% of resin content by volume. Variation of the resin film thickness or of the bleeder material will control the end resin content of the fiber reinforced resin impregnated composite.

The 257° F. temperature and vacuum pressure are retained for 30 minutes, to provide time for resin impregnation of the fiber reinforcement and of the bleeder cloth to occur and for resin viscosity to build up and reduce flow during the heat-pressure step of the cure cycle. Resin impregnation occurs in less than two minutes at 275° F.

After 30 minutes at 275° F., autoclave pressure is increased to 50 to 100 psi, and the vacuum bag is vented to atmosphere. The temperature of the assembly is then raised to 350° F. and the cure cycle is completed at this temperature in two hours. The temperature is then reduced to below 200° F. before reducing the autoclave pressure.

It will be undersood that each specific resin such as epoxy, polyester, polyamide or phenolic resin will have its own suitable resin impregnation and cure cycle.

The vacuum bag is removed from the assembly, followed by removal of the breather cloth, non-porous film, bleeder cloth and parting film. The resulting resin impregnated fiber reinforcement in the form of a laminate or composite, of uniform resin content of about 30 to 35% by volume, and low void volume of less than 1%, and having good mechanical properties is then removed. The resulting laminate or composite made from biwoven graphite has tension and compression strengths greater than 100,000 psi.

If desired, a wet resin can be substituted for the "B" stage resin film of the above example and the graphite reinforcement cloth placed in the resin on the tool surface. The procedure is otherwise the same as that set forth in the above example.

The invention accordingly provides a novel simple procedure for producing resin impregnated fiber reinforced laminates or panels. The present invention process avoids "B" stage resin impregnation of a fiber reinforcement, for use in a later heat and pressure cycle to complete the fabrication process as practiced in the prior art. Instead, both the "B" stage impregnation and final curing are carried out in the same process. This avoids maintaining fiber reinforcement impregnated with "B" stage resin in cold storage until ready for use, as presently practiced. In the present invention and process, the resin is not added to the reinforcement fibers until the overall process including final curing commences.

The invention thus encompasses as novel features the use of a solid "B" stage resin film or liquid resin of controlled thickness or amount for impregnating under vacuum conditions a fibrous reinforcement material located directly in place on a tool, in conjunction with the employment of a porous parting film and a bleeder material to ensure uniform impregnation of the liquid resin to form a void-free resin-impregnated fibrous lay-up or panel. The control of resin impregnation into the fibrous reinforcement is obtained by locating the "B" stage resin film or liquid resin under the cloth to be impregnated, and over such cloth is located a permeable layer and bleeder layer so that when vacuum is pulled from the top and heat is applied, the resin softens and pulls through the fibrous reinforcement, the porous film and into the bleeder material, such control being obtained by provision of a controlled thickness or amount of resin so that the combination of fibrous reinforcement and bleeder cloth will function to provide the required amount of resin in the lay-up or fibrous reinforcement.

While I have described particular embodiments of my invention for purposes of illustration, it will be understood that various changes and modifications within the spirit of the invention can be made, and the invention is not to be taken as limited except by the scope of the appended claims.

What is claimed is:

1. The process for producing a resin-fiber composite which comprises
    (a) forming an assembly comprising a curable resin film, a fiber reinforcement layer, a porous parting film and a bleeder layer, on the surface of a mold, said curable resin film being positioned on the mold surface, said fiber reinforcement layer being positioned over said resin film, said porous parting film being positioned over said fiber reinforcement layer, and said bleeder layer being disposed over said parting film,
    (b) placing said assembly under a vacuum,
    (c) initially heating the assembly while under said vacuum to a temperature sufficient to cause said resin to flow and to impregnate said fiber reinforcement layer, pass through said parting film and impregnate said bleeder layer, the amount of resin employed being sufficient to provide complete saturation of said bleeder layer and therefore provide essentially complete and uniform saturation of resin into said fiber reinforcement layer, and
    (d) further heating said assembly at a sufficient temperature and pressure to effect final curing of the resin impregnated fiber reinforcement layer and to form a resin impregnated fiber reinforcement composite.

2. The process as defined in claim 1, said curable resin film being a thermosetting "B" stage resin.

3. The process as defined in claim 1, said curable resin film being a thermosetting wet resin.

4. The process as defined in claim 1, said resin selected from the group consisting of epoxy, polyester, polyimide and phenolic resins.

5. The process as defined in claim 4, said resin being a "B" stage epoxy resin.

6. The process as defined in claim 1, said fiber reinforcement selected from the group consisting of glass fiber, carbon, graphite, boron and aramide in the form of fibers, cloth, mat, tow, yarn or tape.

7. The process as defined in claim 1, said bleeder layer comprising glass fiber cloth or polyester paper.

8. The process as defined in claim 1, including disassembling said assembly by removing said bleeder layer, said porous parting film and said resin impregnated fiber reinforcement composite as product, said composite being substantially uniformly impregnated with resin and being substantially void-free.

9. The process as defined in claim 1, including disconnecting said vacuum after a period of said initial heating and applying pressure to said assembly during said further heating and final curing stage.

10. The process as defined in claim 1, including vacuum bagging said assembly to permit placing said assembly under a vacuum during said initial heating, and placing said vacuum bagged assembly in an autoclave to permit applying pressure to said assembly during said further heating and final curing stage.

11. The process as defined in claim 1, said initial heating of said assembly being carried out at a temperature and for a time sufficient to increase the resin viscosity and reduce flow of the resin after impregnation thereof into said fiber reinforcement layer and said bleeder layer.

12. The process as defined in claim 11, said resin being an epoxy resin, and said initial heating being carried out at temperature ranging from about 200° to about 300° F. and said final curing being carried out at temperature in the range from about 300° to about 350° F.

13. The process as defined in claim 12, said initial heating taking place at temperature of about 275° F. and including disconnecting said vacuum after the period of said initial heating, and applying pressure to said assembly and heating said assembly to about 350° F. during said further heating and final curing stage.

14. The process for producing a resin-fiber composite which comprises
    (a) placing a curable thermosetting resin film on the surface of a tool,
    (b) applying a dry fiber reinforcement layer over said resin film,
    (c) placing a porous parting film over said reinforcement layer,
    (d) applying a bleeder layer over said reinforcement layer,
    (e) positioning edge dams around the resulting assembly,
    (f) applying a non-porous film over said bleeder layer and said edge dams,
    (g) positioning a breather cloth over said non-porous film,
    (h) applying a vacuum bag over the entire assembly,
    (i) placing the resulting vacuum bagged assembly in an autoclave, then
    (j) drawing a vacuum through said assembly,
    (k) initially heating said assembly while under said vacuum to cause the resin to flow and to impregnate said fiber reinforcement layer, pass through said porous parting film and impregnate said bleeder layer, the amount of resin employed being sufficient to provide essentially complete and uniform saturation of resin into said fiber reinforcement layer,
    (l) disconnecting the vacuum,
    (m) applying pressure to said assembly in said autoclave, and
    (n) further heating said assembly under pressure in said autoclave at a sufficient temperature to effect final curing of the resin impregnated fiber reinforcement layer and to form a resin impregnated fiber reinforcement composite, on said tool.

15. The process as defined in claim 14, said resin selected from the group consisting of epoxy, polyester, polyimide and phenolic resins, said fiber reinforcement being selected from the group consisting of glass fiber, carbon, graphite, boron and aramide, in the form of fibers, cloth or mat, said bleeder layer being of glass fiber cloth or polyester paper.

16. The process as defined in claim 15, said porous parting film being glass fibers coated with fluorocarbon, said non-porous film being nylon, and said breather cloth being glass fiber cloth.

17. The process as defined in claim 14, said curable resin film being a "B" stage epoxy film, said reinforcement layer being graphite cloth, said parting film being a fluorocarbon, said bleeder layer being polyester paper, said non-porous film being nylon and said breather cloth being glass fiber cloth.

18. The process as defined in claim 17 including carrying out said initial heating at about 275° F. for a time sufficient to increase the resin viscosity and reduce flow of the resin following impregnation of said resin into said fiber reinforcement layer and into said bleeder layer, applying a pressure of about 50 to about 100 psi and a temperature of about 350° F. during said further heating and final curing stage, and including removing said vacuum bagged assembly from said autoclave, and disassembling said assembly by removing said vacuum bag, said breather cloth, said non-porous film, said edge dams, said bleeder layer, said parting film and said resin impregnated fiber reinforcement composite as product.

19. The process as defined in claim 1, including vacuum bagging said assembly to permit placing said assembly under a vacuum during said initial heating, and placing said vacuum bagged assembly in an oven to complete the heating and final curing stage under vacuum pressure.

20. The process as defined in claim 1, said resin selected from the group consisting of epoxy, polyester, polyimide and phenolic resins, said fiber reinforcement being selected from the group consisting of glass fiber, carbon, graphite, boron and aramide, in the form of fibers, cloth or mat, said bleeder laying being of glass fiber cloth or polyester paper.

21. The process as defined in claim 1, said porous parting film being selected from the group consisting of a fluorinated hydrocarbon, perforated silicone rubber, and glass fiber cloth coated with a fluorinated hydrocarbon.

22. The process as defined in claim 1, wherein said curable resin is a "B" stage epoxy resin.

23. The process as defined in claim 22, including carrying out said initial heating at about 275° F. and under vacuum pressure for a time sufficient to allow the resin viscosity to lower and to flow and to complete impregnation of said resin into and saturation of said fiber reinforcement layer and said bleeder layer and then increase resin viscosity and reduce resin flow, said further heating being carried out at a pressure of about 50 to 100 psi and vacuum pressure is disconnected and a temperature of about 350° F. is applied to complete the final curing stage.

24. The process for producing a resin-fiber composite structure which comprises:
    (a) placing a curable thermosetting resin film on the surface of a tool,
    (b) applying a dry fiber reinforcement layer over said resin film,
    (c) placing a porous parting film over said reinforcement layer,
    (d) applying a controlled thickness bleeder layer over said porous parting film,
    (e) positioning edge dams on the tool surface to seal around the resulting assembly,
    (f) applying a nonporous film over said bleeder layer, and sealing said porous film to said edge dams with high temperature resisting pressure sensitive tape,
    (g) positioning a breather cloth over said nonporous film,
    (h) applying a vacuum bag over the entire assembly, and sealing said vacuum bag to the tool surface,
    (i) placing the resulting vacuum bagged assembly in an autoclave,
    (j) then, drawing a vacuum through said assembly,
    (k) initially heating said assembly while retaining said vacuum through the assembly to cause the resin to flow, and to impregnate said fiber reinforcement layer, pass through said porous parting film, and impregnate said bleeder layer, the amount of the resin employed being sufficient to provide essentially complete and uniform saturation of resin into said fiber reinforcement layer and said bleeder layer,
    (l) applying pressure in said autoclave to compact said assembly,
    (m) disconnecting said vacuum draw when autoclave reaches compaction pressure,
    (n) further heating said assembly in said autoclave pressure to a sufficient temperature to effect final curing of the resin impregnated fiber reinforcement layer, and to form a resin impregnated fiber reinforcement composite structure on said tool,
    (o) disconnecting said autoclave pressure and removing said assembly from the autoclave, and
    (p) removing said vacuum bag, said breather cloth, said nonporous film, said edge dams, said bleeder layer, and said porous film from said resin impregnated fiber reinforcement composite structure, and
    (q) removing said resin impregnated fiber reinforcement composite structure from said tool surface.

* * * * *

UNITED STATES PATENT AND TRADEMARK OFFICE
CERTIFICATE OF CORRECTION

PATENT NO. : 4,311,661
DATED : 19 January 1982
INVENTOR(S) : Raymond J. Palmer

It is certified that error appears in the above—identified patent and that said Letters Patent is hereby corrected as shown below:

In column 5, line 9, the letter "b" at the end of the line is deleted.

In column 5, line 66, "257°F" should be ---275°F---.

In column 6, line 13, "polyamide" should be ---polyimide---.

In column 9, line 21, "laying" should be ---layer---.

Signed and Sealed this

Seventh Day of December 1982

[SEAL]

Attest:

GERALD J. MOSSINGHOFF

Attesting Officer    Commissioner of Patents and Trademarks